SYMBOL READING SYSTEM
Filed May 31, 1966 4 Sheets-Sheet 1
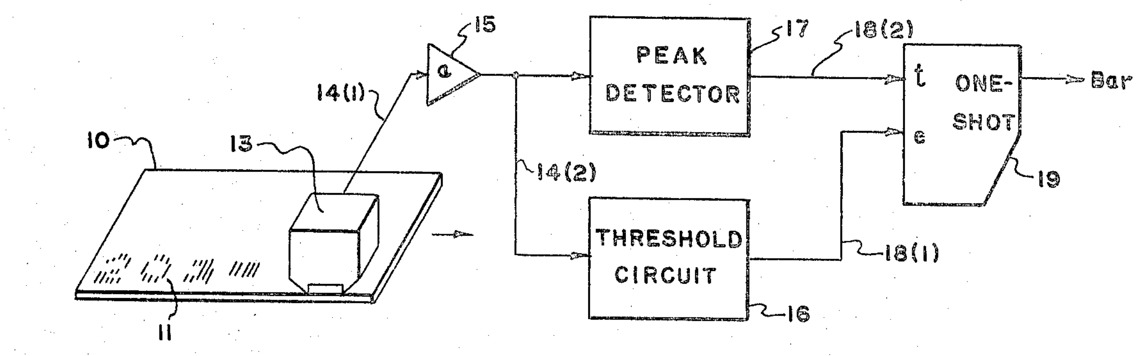
Fig. 1
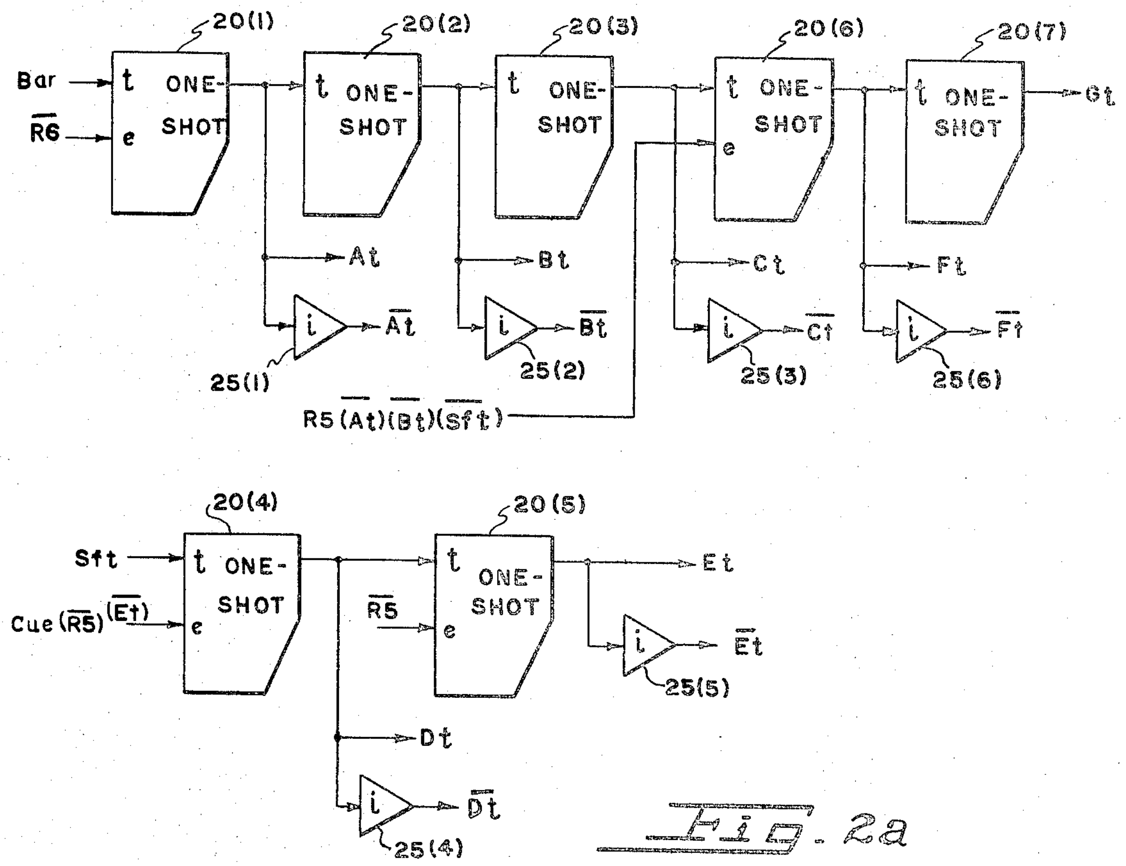
Fig. 2a
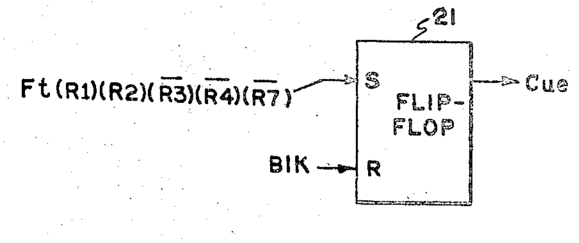
INVENTORS
LELAND J. HANCHETT, JR
PAUL R. LABAHN
RICHARD E. MILFORD
BY Samuel E. Turner
ATTORNEY

SYMBOL READING SYSTEM

Nov. 10, 1970 L. J. HANCHETT, JR., ET AL 3,539,989

SYMBOL READING SYSTEM

Filed May 31, 1966 4 Sheets-Sheet 4

| CODING TABLE | | | | |
|---|---|---|---|---|
| | REGISTER SIGNALS | | | |
| SYMBOLS | R1 | R2 | R3 | R4 |
| ZERO | 0 | 0 | 0 | 0 |
| ONE | 0 | 0 | 0 | 1 |
| TWO | 0 | 0 | 1 | 0 |
| THREE | 0 | 0 | 1 | 1 |
| FOUR | 0 | 1 | 0 | 0 |
| FIVE | 0 | 1 | 0 | 1 |
| SIX | 0 | 1 | 1 | 0 |
| SEVEN | 1 | 0 | 1 | 0 |
| EIGHT | 1 | 0 | 0 | 0 |
| NINE | 1 | 0 | 0 | 1 |
| CUE | 1 | 1 | 0 | 0 |

United States Patent Office 3,539,989

Patented Nov. 10, 1970

3,539,989

SYMBOL READING SYSTEM

Leland J. Hanchett, Jr., Glendale, Ariz., Paul R. La Bahn, Santa Ana, Calif., and Richard E. Milford, Phoenix, Ariz., assignors to General Electric Company, a corporation of New York Filed May 31, 1966, Ser. No. 554,148

Int. Cl. G06k 9/00

U.S. Cl. 340—146.3 8 Claims

ABSTRACT OF THE DISCLOSURE

A symbol recognition system is disclosed for recognizing printed symbols on a document formed by a plurality of spaced bars, employing a detector for producing a signal pulse starting substantially at each bar center line and providing for measuring the spacings between the signal pulses to permit recognition of symbols having bars with printing imperfections.

This invention relates to a system for automatically reading human language and in particular to apparatus for accurately reading and recognizing human languge symbols printed on a document.

Devices for reading printed symbols and for producing corresponding electrical signals are now well-known, they find increasing use in the automation of data handling, such as the automatic processing of checks in a banking system and in processing credit purchase billing documents.

For example, a symbol reading system is disclosed by Richard E. Milford in a U.S. Pat. No. 3,112,469 issued Nov. 26, 1963, entitled Apparatus for Reading Human Language, which is assigned to the same assignee as the present invention. The system therein disclosed is adapted to read symobls printed on a document with magnetizable ink. This patent also discloses a font of stylized human language symbols especially adapted for machine reading. While such systems are in wide spread use, it has been found that the printing tolerances are rather exacting, and expensive and special printing equipment has been found necessary to produce acceptable machine readable printed symbols. In other words, magnetic symbols such as disclosed by Milford cannot normally be printed by high-speed printers used for computer output or by ordinary typewriters. Such limitations are not especially serious in a banking system where a substantial portion of the information can be placed on a check before it is issued by the bank. However, for the automation of a variety of other service operations there is a wide spread need for a symbol reading system which can automatically read symbols printed by high-speed printers, by typewriters, and by other common printing machines. It is therefore a primary object of the invention to provide a symbol reading system which can accurately recognize symbols printed on documents with ordinary printing machines.

It is another object of the invention to provide a system for automatically reading a stylized font of humanly recognizable symbols formed by a plurality of spaced bars, each symbol being formed with a different combination of narrow and wide bar spacings whereby a symbol can be recognized.

It is a further object of the invention to detect the center lines of the bars forming each symbol to thereby provide substantial tolerance to variation in bar width.

It is another object of the invention to recognize a symbol waveshape by detecting the distances between the adjacent peaks of the waveshape.

These and other objects of the invention are achieved in a system according to a preferred embodiment wherein each of the symbols to be recognized is printed on the document in the form of five spaced, substantially parallel bars. The bars thus forming the symbols are generally discontinuous to thereby give humanly recognizable form to the symbols. The bars of each symbol are formed with a unique combination of narrow and wide spaces between adjacent bars by which each symbol can be distinguished from every other symbol of the system.

The symbols thus printed on a document are read by moving the document past the narrow slit of a reading transducer. The reading transducer thereby produces a distinctly different waveshape for each different symbol. The peaks or antinodes of the waveshape will be spaced in accordance with the spacing of the bars of the symbol which is scanned. The waveshape is applied simultaneously to a threshold circuit and a peak detector circuit. The output signals from these two circuits are logically ANDed to produce a bar indicating signal for each peak or antinode of the waveshape. The scanning of a symbol thus results in pulse train of five bar indicating signals which are spaced in time in accordance with the spacing of the bars of the symbol. The time spacing of the five bar indicating signals are now detected and registered to produce a binary coded representation of the symbol scanned. A four-bit shift register is provided to register the four binary bits corresponding to the four spaces between the five bars of a symbol. A fifth stage of the register is provided to indicate that five bar indicating signals have been received for each symbol scanned.

Upon the occurrence of the first peak indicating signal a "1" is place in the first stage of the register. This "1" will eventually be shifted to the fifth stage of the register as an indication that five peak indicating signals have been received. Each bar indicating signal actuates a timing circuit. This timing circuit has an active and an inactve state. When triggered to its active state by a bar indicating signal, the timing circuit remains in its activated state for a perod that is longer than the time between the closely spaced peaks of the waveshape but which is shorter than the time between the widely spaced peaks of the waveshape. Thus upon the occurrence of the second or adjacent bar indicating signal, if the timing circuit is still in its activated state, the shift register is shifted and a "0" is placed in the first stage of the shift register to indicate a narrow spacing of the corresponding adjacent bars of the symbol. If the timing circuit has returned to its inactive state, a "1" is placed in the first stage of the shift register to indicate a wide spacing of the corresponding adjacent bars of the symbol. Thus after the occurrence of the fifth bar indicating signal, the four stages of the shift register will contain a binary representation of the spacing of the bars of the symbol, the "0's" representing close spacings and the "1's" representing wide spacings. This binary coded representation in the shift register is now applied to a decoding circuit by which a signal on a line corresponding to the scanned symbol is produced. If five peak indicating signals have been received the fifth stage of the shift register will now contain a "1", if it does not, then there has been an error and rejection of the document or other corrective action may be taken.

Because the reading system of the present invention detects the peaks of the symbol waveshape to, in effect, determine the centerline-to-centerline spacings of the bars which form the symbol, the system is relatively insensitive to printing degradation such as irregular bar edges, variations in bar width, smearing and the like.

Further features and a more specific description of an illustrative embodiment of the invention are presented hereinafter with reference to the accompanying drawing wherein:

FIG. 1 illustrates a symbol scanner and a circuit for producing a train of accurately spaced pulses corresponding to the spacings of the bars forming the symbols;

FIGS. 2*a* and 2*b* illustrate, in block diagram and logic equation form, the symbol recognition system of the invention;

Figures 4, 5:
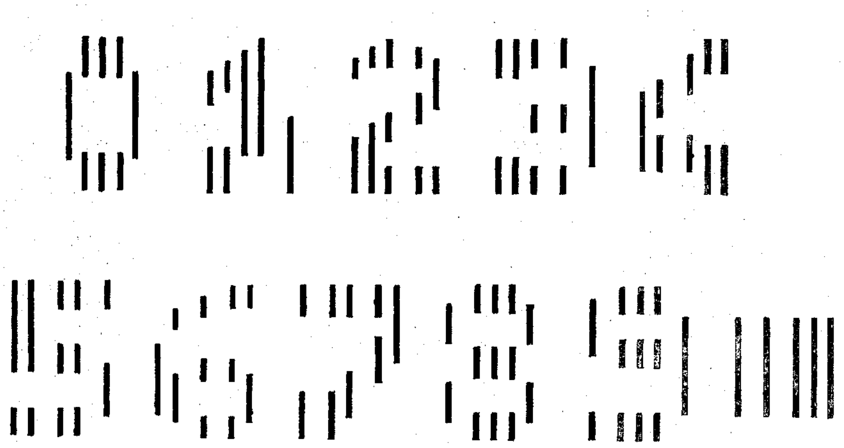
FIG. 4 illustrates a font of symbols of the type that the system of the invention is adapted to recognize.
FIG. 5 is a decoding table showing the corespondence between the symbols and the coded spacings of the bars of the symbols.

Illustrated in FIG. 1 is a document 10 bearing a series of symbols 11 printed with a material such as ink of a color contrasting with the document surface. The symbols 11 are formed according to a system of human language symbols especially designed for machine reading as shown in FIG. 4. As shown in FIG. 4, each symbol is formed of five spaced, substantially parallel, vertical bars, the bars of each different symbol being formed with a unique combination of narrow and wide spaces between adjacent bars by which each symbol can be recognized. In addition to the numerals "0" to "9" the system of symbols includes a "Cue" symbol. The Cue symbol is placed on each document so that it is the first symbol scanned whereby it readies the system for recognition of symbols to follow.

The font of symbols shown in FIG. 4 is shown and claimed by Klaas Bol et al., in U.S. patent application Ser. No. 553,830, filed on even date herewith, and assigned to the assignee of the present invention. The symbols may be formed, for example, with a height of 0.106 inch and with a centerline-to-centerline bar spacing of 0.012 inch for narrow spaced bars and of 0.020 inch for wide spaced bars.

Figure 3:
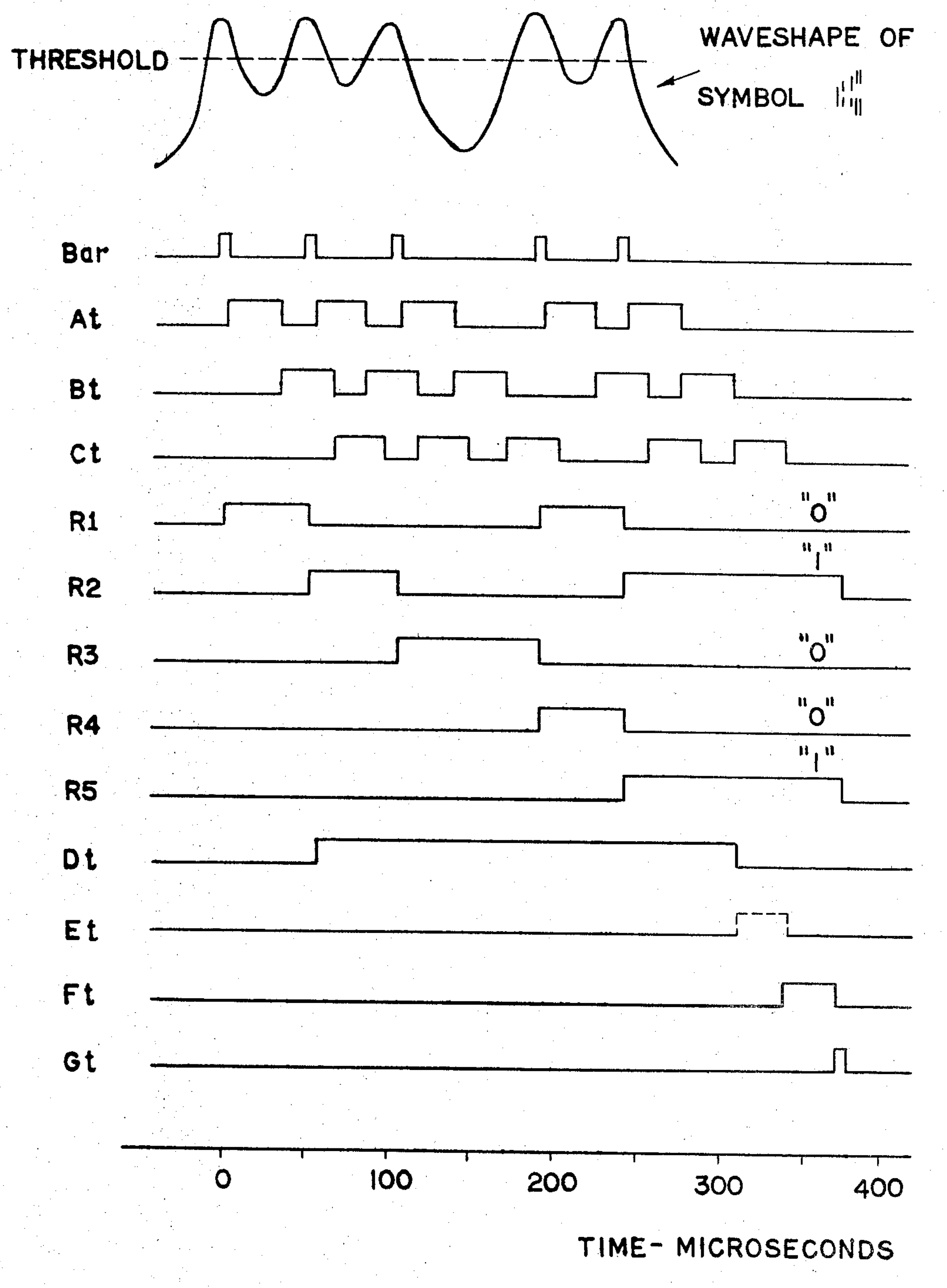
FIG. 3 is a timing diagram illustrating an example of operation of the circuits of FIGS. 1, 2*a* and 2*b*.

To scan the symbols 11, the document 10 is moved to the right, as indicated in FIG. 1, by transport mechanism not shown, past the scanning slit of an optical reading transducer 13. The transducer 13 is adapted to respond to variation in light reflected from the document and the symbols printed thereon to thereby produce a distinctive waveshape on a lead 14(1) for each symbol scanned. The waveshape signal on lead 14(1) is applied to an amplifier 15 whereby the waveshape appears in amplified and inverted form on a lead 14(2). For example, the distinctive waveshape of a symbol "4," in amplified and inverted form, is shown at the top of FIG. 3. The five upward peaks of this inverted waveshape correspond to the five bars of the symbol "4," assuming dark printing on a light document whereby the printed bars provide minimum reflectivity.

The transducer 13 may be any known optical transducer capable of horizontally scanning the symbols. A suitable optical reading transducer is shown by Leland J. Hanchett, Jr., in a U.S. patent application Ser. No. 553,831 filed May 31, 1966 entitled Optical Scanning Device, and assigned to the assignee of the present invention.

The waveshape signal on lead 14(2) is applied simultaneously to a threshold circuit 16 and a peak detector circuit 17. The threshold circuit 16 may be a well-known Schmitt trigger circuit which produces an output voltage of given level on a lead 18(1) in response to input voltages which exceed a predetermined threshold level. The threshold level is adjusted as shown, for example, by the dashed line across the waveshape in FIG. 3 so that the threshold circuit 16 produces an output signal on lead 18(1) for each of the five upward peaks or antinodes of the waveshape.

The peak detector circuit 17 is responsive to the time rate of change of voltage of the waveshape and it is adapted to produce a sharp drop in its output voltage on a lead 18(2) when the waveshape changes from positive to negative slope at the five peaks or antinodes of the waveshape. It is noted that the extreme or zero slope point of each antinode of the waveshape corresponds to the vertical center line of the corresponding bar of the symbol being scanned. Thus, for each symbol scanned, the peak detector 17 produces a series of five negative going output signals which are spaced in time in accordance with the horizontal centerline-to-centerline spacing of the bars of the symbol. (A peak detector circuit which may be adapted for use in the present system is shown by C. Djinis et al., in U.S. patent application Ser. No. 298,640, filed July 30, 1963, and assigned to the same assignee as the present invention.)

The signals from the threshold circuit 16 and the peak detector 17 are applied to a monostable multivibrator or one-shot 19. (The well-known one-shot is a two-state circuit which is normally in a stable reset state. A suitable input signal triggers the one-shot to its astable set state which state it maintains for a predetermined design period after which it automatically returns to its reset state. An example of such a one-shot circuit is shown by Abraham I. Pressman in FIGS. 11–15 of "Design of Transistorized Circuits for Digital Computers," John F. Rider, Publisher, Inc., New York, 1959.)

The lead 18(2) from the peak detector 17 is connected to a triggering input terminal *t* of the one-shot 19 while the lead 18(1) from the threshold circuit 16 is connected to an enabling input terminal *e* of the one-shot 19. Thus the signals from the threshold circuit 16 and the peak detector 17 are logically ANDed in the input circuit of the one-shot 19. In other words, the negative going output signal on lead 18(2) from the peak detector 17 triggers the one-shot 19 to its astable or set state if, and only if, a postive output signal is simultaneously present on the lead 18(1) from the threshold circuit 16. This arrangement provides protection against extraneous signals from the reading transducer 13, as may be produced, for example, by random ink spatters. Such extraneous signals may actuate the peak detector 17 but they usually are below the threshold level of the threshold circuit 16 so that the one-shot 19 is not enabled and it, therefore, is not triggered upon the occurrence of such extraneous signals.

In response to an enabling signal on lead 18(1) and a simultaneous triggering signal on lead 18(2) the one-shot 19 is triggered to its astable or set state, in which state it remains for a predetermined design period (in the present system for about 5 microseconds) after which it returns to its stable or reset state. In its astable or set state the one-shot 19 produces an output signal designated "Bar" to indicate that it corresponds to a bar of the symbol being scanned. In the normal course of events, the one-shot 19 thus produces a series of five Bar pulses, of standardized width and amplitude, in response to the scanning of each symbol, the time spacing of the Bar signals corresponding to the centerline-to-centerline spacing of the bars of the symbol. The Bar signals produced from the scanning of the symbol "4" are illustrated in the timing diagram of FIG. 3.

The series of time-spaced Bar signals produced by the scanning system of FIG. 1 upon the scanning of each symbol thus constitute the electrical signal information from which each symbol can automatically be recognized. A recognition circuit which is responsive to these Bar signals is shown in FIGS. 2*a* and 2*b*.

Figure 2B:
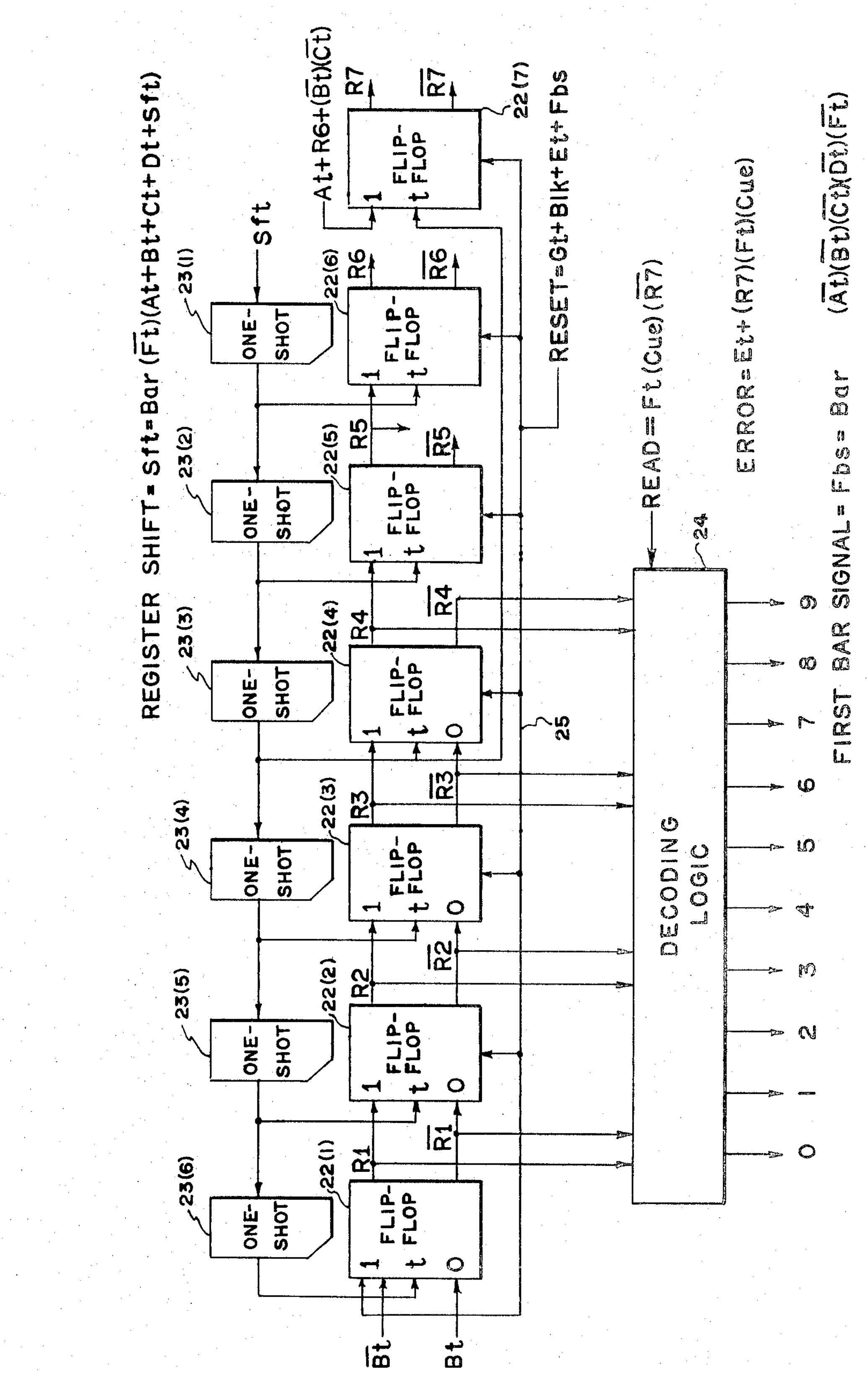

The recognition circuit includes: a series of timing one-shots 20(1)–20(7); a flip-flop 21 for storing an indication of the recognition of a Cue symbol; a series of flip-flops 22(1)–22(7) which constitute the stages of a storage register; a series of one-shots 23(1)–23(6) which provide shifting pulses for the shift register; and a recognition or decoding logic circuit 24. (Suitable circuits for one-shots 20(1)–20(7) and 23(1)–23(6), and for flip-flops 21 and 22(1)–22(7) may be found in the above-mentioned book by Abraham I. Pressman.) Various logic circuits are illustrated in FIGS. 2*a* and 2*b* in well-known logic equation form. The usual convention of the indicated product for the AND function and of the indicated sum for the OR function is employed. For example, the term Cue ($\overline{R5}$) ($\overline{Et}$) at the enabling input terminal of the one-shot 20(4) of FIG. 2*a* represents a well-known AND gate which produces an enabling output signal only when the signals Cue, $\overline{R5}$ and $\overline{Et}$ are simultaneously present. The well-known OR gate is represented, for example, by the equation $$\text{Reset}=Gt+Blk+Et+Fbs$$

in FIG. 2*b*. Such an OR gate produces an output signal in response to the presence of any one or more of the signals *Gt, Blk, Et* or *Fbs*.

In the structure illustrated in FIG. 2*a* a series of logic inverters 25(1)–25(6) are provided to furnish the logical complement of certain of the timing signals. For example, the inverter 25(1) provides the logical complement $\overline{At}$ of the signal A*t*. It is to be understood that complementary signals are mutually exclusive, that is, if a signal is at a high voltage level the complementary signal is at a low voltage level and vice versa. In the following description a signal that is at an arming or enabling level will be referred to as at a high level, or simply that the signal is high, while a signal that is at a disarming or disabling level will be referred to as low.

Operation of the recognition circuit of FIGS. 2*a* and 2*b* will now be described with reference to the timing diagram of FIG. 3 which shows the various signals and the states of the register stages during the scanning and recognition of a symbol "4." (It will be assumed that the cut symbol storage flip-flop 21 is in its set state to provide a high level of the signal Cue as a result of the prior scanning and recognition of a cue symbol which always precedes a field of symbols to be recognized.)

As previously described, the scanning arrangement of FIG. 1 produces a series of five Bar signals spaced in accordance with the peaks of the symbol waveshape and hence in accordance with the centerline-to-centerline spacing of the bars. The Bar signals resulting from the scanning of a symbol "4" are shown in FIG. 3. In the present illustrated embodiment the Bar signals are time spaced by about 52 microseconds for close-spaced bars and about 86 microseconds for wide-spaced bars.

In FIG. 2*a* these Bar signals are applied to the triggering input *t* of one shot 20(1). The signal $\overline{R6}$ is applied to the enabling input terminal of one-shot 20(1). The signal $\overline{R6}$ is the output signal from the reset or "0" side of the flip-flop 22(6). This flip-flop detects the occurrence of a 6th bar in sequence as will be explained hereinafter. Assuming for the present that the signal $\overline{R6}$ is high, the negative trailing edge of the first Bar signal triggers the one-shot 20(1) to its astable state and its output signal A*t* assumes a high level.

The Bar signals are also applied to an AND gate represented in FIG. 2*b* by the expression $$\text{FIRST BAR SIGNAL} = Fbs = \text{Bar}\,(\overline{At})(\overline{Bt})(\overline{Ct})(\overline{Dt})(\overline{Ft})$$

Upon the occurrence of the first bar signal it may be seen from FIG. 3 that the signals A*t*, B*t*, C*t*, D*t* and F*t* are at a low level, therefore, the complements of these signals are at a high level whereby the AND gate is enabled to produce its output signal F*bs* in response to the first Bar signal. The signal F*bs* is applied as one term of a common reset signal to an ungated input terminal at the set or "1" side of the first flip-flop 22(1) of the register, and to an ungated reset input of flip-flops 22(2)–22(7). In other words, the first Bar signal triggers the flip-flop 22(1) to its "1" or set state as shown in FIG. 3 by the signal R1. This "1" subsequently will be shifted through the register to flip-flop 22(5), the fifth stage of the register, wherein it will indicate that five Bar pulses have been received.

Returning now to the one-shot 20(1), the period of this circuit is about 32 microseconds which is less than the 52 microseconds between closely spaced Bar signals. When the one-shot 20(1) returns to its stable state, its output signal A*t* drops to a low level. This trailing negative edge of the signal A*t* triggers the one-shot 20(2) to its astable state and the output signal B*t* of the one-shot 20(2) assumes its high level. The period of one-shot 20(2) is also about 32 microseconds. It is to be noted that the sum of the periods of one-shots 19, 20(1) and 20(2) is thus about 69 microseconds, which is longer than the 52 microseconds between closely spaced Bar signals, but less than the 86 microseconds between widely spaced Bar signals. The one-shots 20(1) and 20(2) thus constitute a two-phase timing circuit by which the wide and narrow spaces between bars are distinguished, the signal B*t* providing the indication of whether adjacent Bar signals are closely or widely spaced. In other words, each Bar signal produces a signal A*t* followed by a signal B*t*. If the next Bar signal occurs while the signal B*t* is still high, then the bars are closely spaced; whereas if the next Bar signal occurs after the signal B*t* has returned to its low level, then the bars are widely spaced.

The signal B*t* (and its complement $\overline{Bt}$) is therefore applied to the register of FIG. 2*b* in order to store this bar spacing information by which the symbol is recognized.

It was found desirable to register a wide spacing as a binary "1" and a narrow spacing as a binary "0." For this reason, the signal $\overline{Bt}$ is applied to a gated input terminal at the "1" side of flip-flop 22(1) and the signal B*t* is applied to a gated input terminal at the "0" side. (These signals do not cause a change in the state of the flip-flop until a trigger signal is received at the triggering input *t* of the flip-flop.)

Referring again to FIG. 3, upon the occurrence of the second Bar signal, the signal B*t* is still high, thus indicating close spacing between the first two Bar signals. The signal B*t* at the input of the flip-flop 22(1) thus enables the internal AND gate of this flip-flop for entry of a binary "0." It is necessary to next consider the shifting arrangement of the register of FIG. 2*b* whereby the contents of each stage is shifted to the next register stage. Shifting is accomplished by the series of short-period (less than one microsecond) one-shots 23(1)–23(6). A shift signal S*ft* is applied to the first one-shot 23(1). The shift signal S*ft* is the output signal of a logic circuit defined in FIG. 2*b* as follows:

$$\text{REGISTER SHIFT SIGNAL}=Sft=\text{Bar}\,(\overline{FT})(At+Bt+Ct+Dt+Sft)$$

In other words, each Bar signal produces a shift signal S*ft* if the complement signal $\overline{Ft}$ of one-shot 20(6) is high, and if one or more of the signals A*t*, B*t*, C*t* or D*t* is high. Normally, each Bar signal, except the first, results in a shift signal S*ft*.

The shift signal S*ft* triggers the one-shot 23(1) to its astable state whereby a triggering signal is applied to the triggering input terminals of flip-flip 22(6). When the one-shot 23(1) returns to its astable state, the trailing edge of its output pulse triggers the next one-shot 23(2). This action proceeds down the series of one-shots with each one-shot in turn triggering the respectively associated one of the flip-flops 22(5)–22(1), it being noted that one-shot 23(3) triggers both flip-flops 22(4) and 22(7).

Thus upon the occurrence of the second Bar signal, the register is shifted and, as shown in FIG. 3, the "1" in flip-flop 22(1) is shifted to flip-flop 22(2) and a "0" is entered into flip-flop 22(1) to indicate the close spacing of the first two Bar signals.

The first shift pulse S*ft* (which occurs upon the second Bar signal) also normally triggers the one-shot 20(4) of FIG. 2*a* to its astable state whereby its output signal D*t* assumes its high level, as shown in FIG. 3. The period of one-shot 20(4) is relatively long, about 255 microseconds, and its purpose is to establish a timing base for determining whether or not the correct number of Bar signals (five) are received during the scanning of a symbol. The one-shot 20(4) is enabled by the logical AND of the signals Cue ($\overline{R5}$)($\overline{Et}$), which means that the cue symbol flip-flop 21 is in its set state to indicate that a cue symbol has been scanned and recognized, the flip-flop 22(5) is in its reset state to indicate that less than five Bar signals have been received, and that no error signal E*t* is present.

When the one-shot 20(2), FIG. 2*a*, returns to its stable state, the negative going trailing edge of the output signal B*t* triggers the one-shot 20(3) to its estable state. The purpose of one-shot 20(3) is to provide a delay period for error detection and to initiate a read timing signal F*t* (FIG. 2*a*) after the fifth Bar signal has been received.

Upon occurrence of the third Bar signal the series of timing signals A*t*, B*t* and C*t* is again produced. Also a register shift signal S*ft* is again produced whereby the "1" in flip-flop 22(2), signal R2, is shifted to flip-flop 22(3), the "0" in flip-flop 22(1), signal R1, is shifted to flip-flop 22(2), and a "0" is entered into flip-flop 22(1) to indicate the close spacing of the second and third Bar signals.

As seen in FIG. 3, there is a wide space between the third and fourth bars of the symbol "4". Therefore, upon the occurrence of the fourth Bar signal the timing signal B*t* is low and its complement $\overline{Bt}$ is high. The signal $\overline{Bt}$ is applied to the gated set input terminal of the register flip-flop 22(1). Thus upon occurrence of the register shift signal S*ft*, in response to the fourth Bar signal, the "1" in flip-flop 22(3), signal R3, is shifted to flip-flop 22(4), the "0" in flip-flop 22(2), signal $\overline{R2}$, is shifted to flip-flop 22(3), the "0" in flip-flop 22(1), signal $\overline{R1}$, is shifted to flip-flop 22(2), and a "1" is entered into flip-flop 22(1) to indicate the wide spacing of the third and fourth Bar signals.

Upon occurrence of the fifth Bar signal, the pattern in the register is again shifted and a "0" is entered into the flip-flop 22(1) to indicate the close spacing of the fourth and fifth Bar signals. Thus, the final binary pattern in the register upon the normal scanning of a symbol "4" is "01001" in register flip-flops 22(1)–22(5), respectively. The flip-flops 22(1)–22(4) thus contain a binary coded representation of the scanned symbol in accordance with the unique spacing of the bars which form the symbol and the flip-flop 22(5) contains a "1" to indicate that the normal five Bar signals have been received.

The next operation of the circuit is the decoding of the information in the flip-flops 22(1)–22(4) from its binary form to a one-out-of-ten form whereby an output symbol signal is produced on a line corresponding to the scanned symbol. For this purpose a decoding logic circuit 24 (FIG. 2*b*) is provided. The circuit 24 may be any well-known logic circuit adapted to perform the necessary binary-to-decimal decoding as indicated in the logic table of FIG. 5. (In the table of FIG. 5 a wide space between bars is represented as a "1" and a narrow space by a "0.")

As shown in FIG. 2*b*, the register output signals R1–R4 and $\overline{R1}$–$\overline{R4}$ are applied over respective lines to the decoding logic circuit 24. These lines are gated in well-known manner so that the register signals are applied to the decoding logic circuit only upon the occurrence of a Read signal which is the output signal of a logic circuit defined by Read=*Ft* (Cue)($\overline{R7}$). The signal F*t* is the read timing signal and it is developed as follows: When one-shot 20(3) returns to its stable state after the fifth and last Bar signal, the trailing edge of the signal C*t* constitutes a triggering signal applied to the triggering input terminal of one-shot 20(6). The one-shot 20(6) is enabled by the logical AND of signals R5

$$(\overline{At})(\overline{Bt})(\overline{Sft})$$

All of these signals normally will be high (as shown in FIG. 3) at the time of the trailing edge of the last period of the signal C*t*. The one-shot 20(6) is, therefore, triggered to its astable state to produce the high level of the read timing signal F*t*.

As set forth above, the Read signal (FIG. 2*b*) is the logical AND of the signals F*t*(Cue)($\overline{R7}$). The signals Cue and $\overline{R7}$ will be high in the absence of errors or other anomalies of operation. Thus the Read signal follows the read timing signal F*t* whereby the gated input lines of the decoding circuit are enabled to apply the register signals R1–R4 and $\overline{R1}$–$\overline{R4}$ to the decoding logic circuitry. Signals on the symbol output lines from the decoding logic circuit 24 may be applied to a data processing device or other utilization means (not shown).

When the one-shot 20(6) returns to its stable or reset state, the trailing edge of the signal F*t* triggers the one-shot 20(7). The one-shot 20(7) has a relatively short period (about 5 microseconds) and its purpose is to produce a reset pulse G*t*. As shown in FIG. 2*b*, the reset signal G*t* is applied to a reset line 25. The reset line 25 is connected to an ungated reset terminal of each of the register flip-flops 22(2)–22(7) whereby each of these flip-flops is returned to its reset or "0" state in response to the reset signal G*t*. It is noted that the Reset signal is the logical OR of the signals $Gt+Blk+Et+Fbs$. The signal B*lk* is a blanking signal received from an external source. Such a signal may be produced, for example, by photocell means which provides a high level of the signal B*lk* when no document is present in the document scanning device. The signal E*t* is an error signal, discussed hereinafter, and the signal *Fbs* is the first Bar signal, as discussed hereinbefore.

As previously mentioned, it is arranged, as shown in FIG. 1, that a cue symbol always precedes a series of symbols to be recognized by the present system. The flip-flop 21 (FIG. 2*a*) is provided to store an indication of the scanning and recognition of a cue symbol. The flip-flop 21 is set by the logical AND of the register signals F*t* (R1)(R2)($\overline{R3}$)($\overline{R4}$)($\overline{R7}$). When the flip-flop 21 is in its set state, the output signal *Cue* is high, as previously mentioned. The cue symbol flip-flop 21 is reset by the previously mentioned blanking signal B*lk*.

The foregoing describes the structure and normal operation of the system in the recognition of a scanned symbol. Remaining to be described are the error detection circuits. As illustrated in FIG. 2*b*, an error indication is the output signal of a logic circuit as follows:

$$\text{Error}=Et+(R7)(Ft)(Cue)$$

The signal E*t* indicates that more than one, but less than five, Bar signals were received for the symbol scanned. The signal R7 indicates that six Bar signals were received or that at least two adjacent bars of the symbol scanned were too closely spaced or too widely spaced.

The error signal E*t* is produced as follows: as previously mentioned, the first shift pulse S*ft* (which occurs upon the second bar signal) also triggers the one-shot 20(4), FIG. 2*a*, to its astable state as shown in FIG. 3. When the one-shot 20(4) returns to its stable state, which is normally after the fifth Bar signal has been received, the trailing edge of the signal D*t* is applied to the triggering input terminal of the one-shot 20(5). If five Bar signals have been received, the signal $\overline{R5}$, from the fifth register flip-flop 22(5), will be low and, thus, the one-shot 20(5) will not be enabled. However, if less than five Bar signals have been received, the signal $\overline{R5}$ will be high (the "1" entered into flip-flop 22(1) by the first Bar signal will not have been shifted into flip-flop 22(5) by less than five Bar signals) and, thus, the one-shot 20(5) is enabled so that it is triggered by the trailing edge of signal D*t* to produce the error signal E*t*.

The error signal R7 may result from receipt of more than five Bar signals as follows: In the normal recognition operation five Bar signals are received which results in four shift pulses S*ft*, the first Bar signal setting flip-flop 22(1) to indicate a "1." This "1" is shifted by the following four shift pulses to flip-flop 22(5). However, if a sixth Bar signal is received, another shift pulse will be produced and the "1" in flip-flop 22(5) will be shifted to flip-flop 22(6) upon the occurrence of the shift signal from one-shot 23(2). The signal R6 thus becomes high whereby a "1" is now entered into the flip-flop 22(7) upon occurrence of the shift signal from one-shot 23(3). The signal R7 thereupon becomes high to indicate the erroneous receipt of the sixth Bar signal.

The error signal R7 may also result from any two adjacent Bar signals that are too closely or too widely spaced as follows: The output signal of a logic circuit defined by $At+R6+(\overline{Bt})(\overline{Ct})$ is applied to the input terminal of the set side of flip-flop 22(7). Thus, if two Bar signals occurs within the period of the one-shot 20(1), the signal $At$ will be high, thus enabling the set input of the flip-flop 22(7). Thus, upon the occurrence of the shift pulse resulting from the second of the too closely spaced Bar signals, the flip-flop 22(7) will be set whereby the signal R7 becomes high to indicate the too closely spaced bars. The logic AND of the signals $(\overline{Bt})(\overline{Ct})$ will be high if adjacent bars are too widely spaced. Thus the flip-flop 22(7) will be set if this condition occurs.

Thus what has been described is a system for automatically reading and recognizing the symbols of a font of human language symbols especially adapted for printing by high-speed printers such as computer output printers, by typewriters and by other common printing machines.

Outstanding advantages of the present system as compared to prior reading systems may be summarized as follows: In prior systems, which detect symbols printed with magnetic ink such as shown in the previously mentioned U.S. Pat. No. 3,112,469, the symbol waveshape produced is the derivative of the pattern of magnetic material. Thus, in such prior systems the position and uniformity of the edges of the magnetic material is quite critical. As is well-known, the attainment of sharply defined, uniform edges is one of the most difficult qualities to achieve in the printing art. Thus the printing of symbols for detection by prior systems has required rather specialized and expensive printing equipment.

In contrast, in the system of the present invention the waveshape is a direct function of the light-dark pattern of printing. The recognition system of the present invention is thus designed to detect the peaks of the symbol waveshape where these peaks correspond to the centerlines and not to the edges of the bars forming the symbols. The present recognition system is thus based upon the detection of the centerline-to-centerline spacings of the bars of the symbol. This provides the following advantages: The system does not require sharply defined bar edges because centerline peaks and not the bar edges are detected. The system is tolerant to variations in bar width for the same reason. A considerable amount of smearing and extraneous ink between bars can be tolerated. The only requirement is sufficient contrast to provide reasonably definite peaks and an absence of extraneous or shifted peaks above the threshold level. (Even if the waveshape exceeds the threshold level between peaks, see FIG. 3, the symbol may be correctly recognized if there are no extraneous peaks.) The present system is also quite tolerant of vertical printing smear as is typical of rotating drum type printers widely used for computer output.

While the principles of the invention have been made clear in the illustrative embodiments, there will be obvious to those skilled in the art, many modifications in structure, arrangement, proportions, the elements, materials, and components used in the practice of the invention, and otherwise, which are adapted for specific environments and operating requirements, without departing from these principles. The appended claims are, therefore, intended to cover and embrace any such modifications within the limits only of the true spirit and scope of the invention.

What is claimed is:

1. The combination of: a document; a plurality of different symbols arranged in a row on the face of said document, each of said symbols being formed by a plurality of spaced substantially parallel bars, said bars being formed with a material having a color contrasting with the surface of said document, each of said different symbols being formed with a unique combination of narrow and wide spaces between the bars forming the symbol; a scanning means for scanning said symbols, said scanning means being responsive to each different symbol for producing a corresponding unique waveshape signal, said waveshape signal having a peak for each bar of the corresponding symbol; a peak detector circuit connected to receive said waveshape signals from said scanning means, said peak detector circuit producing a scanner output signal in response to a predetermined change in slope of said waveshape signal, said output signal being a signal pulse starting substantially at a centerline of a corresponding bar; timing means actuated by each scanner output signal, said timing means producing a timing signal having a period which is greater than scanning time between adjacent narrow spaced bars and less than the scanning time between adjacent wide spaced bars; and means jointly responsive to said timing and scanner output signals for producing a narrow space indication in response to concurrent timing and scanner output signals and for producing a wide space indication in response to a scanner output signal in the absence of said timing signal.

2. A system for automatically reading intelligence printed on a document, comprising: a plurality of different symbols arranged in a row on the face of said document, each of said symbols being formed by a plurality of substantially parallel, spaced bars, each of said different symbols being formed with a unique combination of narrow and wide spaces between said bars; scanning means for scanning said symbols; said scannings means being responsive to each different symbol for producing a corresponding unique waveshape signal, said waveshape signal having an antinode for each bar of the corresponding symbol; a threshold circuit connected to receive waveshape signals from said scanning means, said threshold circuit producing an output signal in response to waveshape signals above a predetermined amplitude; a peak detector circuit connected to receive said waveshape signals from said scanning means, said peak detector circuit producing an output signal in response to a predetermined change in slope of said waveshape signal, said output signal being a signal pulse starting substantially at a centerline of a corresponding bar; a gating circuit connected to receive signals of said threshold and peak detector circuits, said gating circuit being responsive to the simultaneous signals from said peak detector and threshold circuits for producing a bar indicating output signal; and means responsive to the time sequence of the bar indictating signals produced from a waveshape signal for producing an output signal indicative of the symbol scanned.

3. A system for recognizing each of a plurality of different waveshapes, each waveshape having a plurality of peaks of like polarity, each different waveshape having a different combination of wide and narrow spaces between its peaks, comprising: a threshold circuit for receiving each waveshape, said threshold circuit producing a threshold signal when said waveshape is above a predetermined reference level; a peak detector circuit for receiving said waveshape, said peak detector circuit being responsive to a predetermined change in slope of said waveshape for producing a peak signal; means responsive to simultaneous threshold and peak signals for producing a peak indicating signal; a timing circuit having an actuated and an unactuated state, said timing circuit being responsive to said peak indicating signal to assume its active state for a predetermined period, said timing means having a period which is greater than the time between adjacent narrowly spaced peaks of said waveshape and less than the time between adjacent widely spaced peaks of said waveshape; and means jointly responsive to said peak indicating signal and the state of said timing means for registering the combination of close and wide spaces between the peaks of said waveshape.

4. A system for automatically reading a plurality of human language symbols on a document, said symbols being formed of a plurality of spaced substantially parallel bars, the adjacent bars of each symbol being spaced by one of a predetermined number of different predetermined spacings whereby the bars of each symbol are spaced by respective different combination of said predetermined spacings, the combination of: means for scanning the symbols on said document, said scanning means being responsive to each different symbol for producing a corresponding unique waveshape signal, said waveshape signal having a peak for each bar of the corresponding symbol; a peak detector circuit connected to receive said waveshape signals from said scanning means, said peak detector circuit producing a time-spaced signal in response to a predetermined change in slope of said waveshape signal, a series of said time-spaced signals being produced and spaced in proportion to the spacings of the bars of the symbol scanned, each of said time spaced signals being a signal pulse starting substantially at a center line of a corresponding bar; sensing means for sensing the time spacing between adjacent pairs of said signals and for providing a different indication for each different time spacing; register means for registering the indication from said sensing means for each symbol scanned; and decoding means responsive to the indications registered by said register means for producing an output signal representative of the symbol scanned.

5. A reading system comprising: a document bearing humanly recognizable symbols, each of said symbols being formed of a plurality of spaced, substantially parallel bars, adjacent ones of said bars being spaced by a predetermined wide or a predetermined narrow space, the bars of each symbol being spaced by a combination of wide and narrow spacings different from the combination of spacings of every other symbol; means for scanning the symbols on said document, said scanning means being responsive to each different symbol for producing a corresponding unique waveshape signal, said waveshape signal having a peak for each bar of the corresponding symbol; a peak detector circuit connected to receive said waveshape signals from said scanning means, said peak detector circuit producing a time-spaced bar-indicating signal in response to a predetermined change in slope of said waveshape signal, a series of time-spaced bar-indicating signals produced and spaced in proportion to the centerline-to-centerline spacing of the bars of the symbol scanned, each of said bar-indicating signals being a signal pulse starting substantiall at a center line of a corresponding bar; a two-phase timing circuit producing a first-phase signal initiated by each bar-indicating signal and terminating at a time before the occurrence of the second of narrow spaced bar-indicating signals and producing a second-phase signal spanning the time of occurrence of the second of narrow spaced bar-indicating signals but terminating before the occurrence of the second of wide spaced bar-indicating signals; means for simultaneously sensing for said second-phase signal and said bar-indicating signals for providing a narrow space indication in response to concurrent bar-indicating and second-phase signals, and for providing a wide space indication in response to a bar-indicating signal in the absence of said second-phase signal; storage means for registering said narrow space and wide space indications; and decoding means responsive to the space indications registered by said storage means for producing an output signal representative of the symbol scanned.

6. The system defined by claim 5 further including error indicating means responsive to a sixth bar-indicating signal occurring within a predetermined time after a fifth bar-indicating signal for producing an error indication.

7. The system defined by claim 5 further including error indicating means responsive to the concurrence of a bar-indicating signal and said first-phase signal for producing an error indication.

8. The system defined by claim 5 further including a bar-indicating signal counter for providing an indication that five bar indicating signals have been received from the symbol scanned; and error indicating means enabled by the absence of said indication from said bar-indicating signal counter for providing an error indication when more than one, but less than five, bar-indicating signals have been received during the scanning time of a symbol.

References Cited

UNITED STATES PATENTS

| | | | |
|---|---|---|---|
| 2,952,008 | 9/1960 | Mitchell et al. | 235—61.12 |
| 2,961,649 | 11/1960 | Eldredge et al. | 340—146.3 |
| 3,044,696 | 7/1962 | Feissel | 340—146.3 |
| 3,283,303 | 11/1966 | Cerf | 340—146.3 |
| 3,286,233 | 11/1966 | Lesueur | 340—146.3 |
| 3,303,469 | 2/1967 | Perotto | 340—146.3 |
| 3,309,667 | 3/1967 | Feissel et al. | 340—146.3 |
| 3,354,432 | 11/1967 | Lamb | 340—146.3 |
| 3,320,588 | 5/1967 | Gallien | 340—146.3 |

THOMAS A. ROBINSON, Primary Examiner

U.S. Cl. X.R.

235—61.11